US012579770B2

(12) United States Patent
Kawakami

(10) Patent No.: US 12,579,770 B2
(45) Date of Patent: Mar. 17, 2026

(54) DETECTION SYSTEM, DETECTION METHOD, AND NON-TRANSITORY STORAGE MEDIUM

(71) Applicant: NEC Corporation, Tokyo (JP)

(72) Inventor: Kazuya Kawakami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 18/238,110

(22) Filed: Aug. 25, 2023

(65) Prior Publication Data

US 2024/0078782 A1 Mar. 7, 2024

(30) Foreign Application Priority Data

Sep. 1, 2022 (JP) ................................. 2022-139110

(51) Int. Cl.
*G06K 9/00* (2022.01)
*B64C 39/02* (2023.01)
*G06V 10/25* (2022.01)

(52) U.S. Cl.
CPC ............ *G06V 10/25* (2022.01); *B64C 39/024* (2013.01); *G06V 2201/07* (2022.01)

(58) Field of Classification Search
CPC .... G06V 10/25; G06V 2201/07; G06V 20/17; G06V 20/52; G06V 20/60
See application file for complete search history.

(56) References Cited

U.S. PATENT DOCUMENTS

| | | | | |
|---|---|---|---|---|
| 7,535,353 | B2 * | 5/2009 | Hirai ...................... | G06V 20/52 |
| | | | | 340/609 |
| 9,179,309 | B2 * | 11/2015 | Rogers .................. | H04W 12/08 |
| 11,276,177 | B1 * | 3/2022 | Tsai ........................ | G06T 7/174 |
| 11,830,080 | B1 * | 11/2023 | Serrao ................... | B64U 10/13 |
| 12,361,677 | B2 * | 7/2025 | Keefe .................... | G06V 10/25 |
| 2007/0189585 | A1 * | 8/2007 | Sukegawa ............... | G07C 9/37 |
| | | | | 382/118 |
| 2008/0151078 | A1 * | 6/2008 | Konno ................... | H04N 23/69 |
| | | | | 348/240.99 |

(Continued)

FOREIGN PATENT DOCUMENTS

| | | | | | |
|---|---|---|---|---|---|
| CN | 109791405 | A | * | 5/2019 | ............. H04N 23/62 |
| JP | 2012109733 | A | * | 6/2012 | |

(Continued)

OTHER PUBLICATIONS

Image Processing Based Proposed Drone for Detecting and Controlling Street Crimes, Shahid Karim et al., IEEE, 2017, pp. 1725-1730 (Year: 2017).*

(Continued)

*Primary Examiner* — Jayesh A Patel
(74) *Attorney, Agent, or Firm* — Sughrue Mion, PLLC

(57) ABSTRACT

A detection system includes an acquisition unit, a map generation unit, a determination unit, and a detection unit. The acquisition unit acquires a first image and a second image. The second image is an image acquired by capturing an image of a narrower area than in the first image. The map generation unit generates, by using the first image, map information. The determination unit determines a target area in the map information. The detection unit analyzes the second image acquired by capturing an image of the target area, and thereby detects a target object.

19 Claims, 8 Drawing Sheets

(56) References Cited

U.S. PATENT DOCUMENTS

| | | | | |
|---|---|---|---|---|
| 2011/0106434 A1* | 5/2011 | Ishihara | ................. | G01C 21/26 |
| | | | | 348/148 |
| 2012/0147246 A1* | 6/2012 | Dent | ..................... | H04N 23/62 |
| | | | | 348/333.12 |
| 2016/0350615 A1* | 12/2016 | Yano | ...................... | G06V 20/53 |
| 2017/0031355 A1* | 2/2017 | Jung | ...................... | H04N 7/183 |
| 2018/0349708 A1* | 12/2018 | Van Hoof | ........ | G08B 13/19684 |
| 2019/0057252 A1* | 2/2019 | Ichihara | .............. | G06V 40/172 |
| 2019/0373173 A1* | 12/2019 | Wang | .................. | H04N 23/661 |

FOREIGN PATENT DOCUMENTS

| | | | | | |
|---|---|---|---|---|---|
| JP | 2017-163511 A | | 9/2017 | | |
| JP | 2022047756 A | * | 3/2022 | | |
| WO | WO-2018023555 A1 | * | 2/2018 | ..... | H04N 21/234363 |

OTHER PUBLICATIONS

A survey on vision-based UAV navigation, Yuncheng Lu et al., Taylor and Francis, 2018, pp. 21-32 (Year: 2018).*

A UAV System for Autonomous Target Detection and Gas Sensing, Tyler Kersnovski et al., IEEE, 2017, pp. 1-12 (Year: 2017).*

* cited by examiner

110 — ACQUISITION UNIT

130 — MAP GENERATION UNIT

150 — DETERMINATION UNIT

170 — DETECTION UNIT

Figure 3:
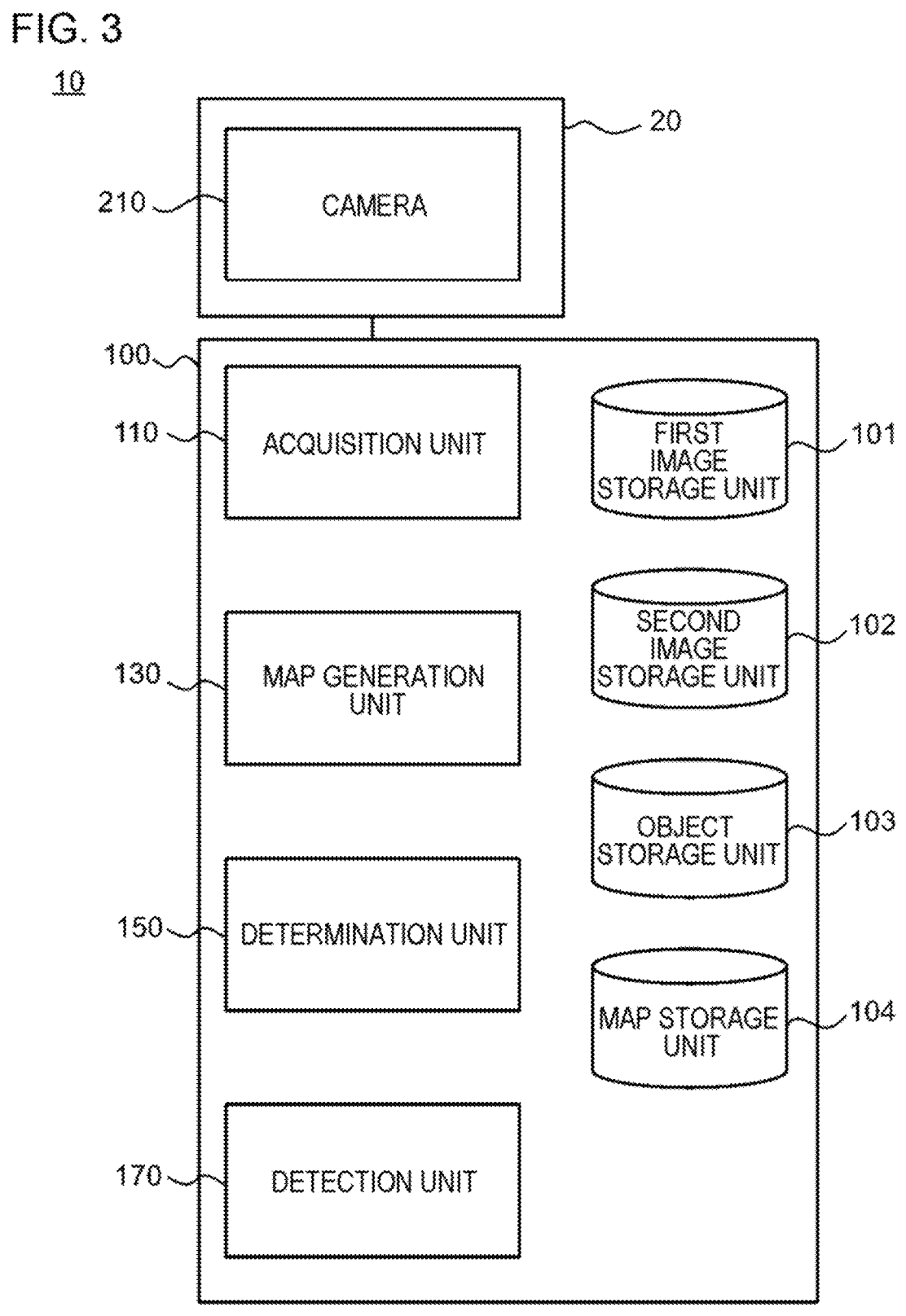

210 CAMERA

100

110 ACQUISITION UNIT

101 FIRST IMAGE STORAGE UNIT

130 MAP GENERATION UNIT

102 SECOND IMAGE STORAGE UNIT

150 DETERMINATION UNIT

103 OBJECT STORAGE UNIT

104 MAP STORAGE UNIT

170 DETECTION UNIT

FIG. 5

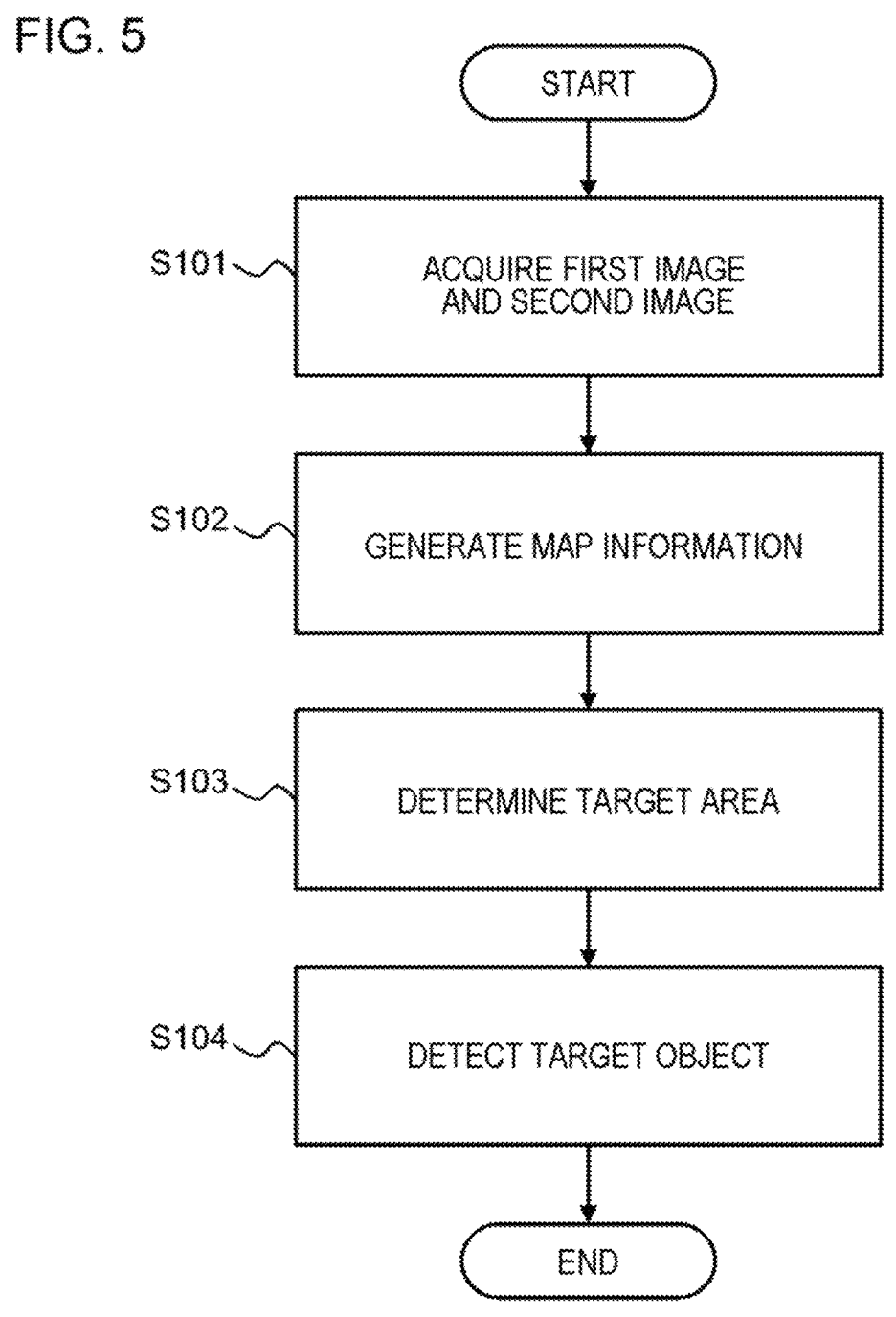

START

S101 — ACQUIRE FIRST IMAGE AND SECOND IMAGE

S102 — GENERATE MAP INFORMATION

S103 — DETERMINE TARGET AREA

S104 — DETECT TARGET OBJECT

END

DETECTION SYSTEM, DETECTION METHOD, AND NON-TRANSITORY STORAGE MEDIUM

This application is based upon and claims the benefit of priority from Japanese patent application No. 2022-139110, filed on Sep. 1, 2022, the disclosure of which is incorporated herein in its entirety by reference.

BACKGROUND

Technical Field

The present invention relates to a detection system, a detection method, and a program.

Background Art

In recent years, a technique for detecting, by using an image captured by a drone or the like, a target object is being developed. Such a technique is used, for example, for search activity in a disaster site.

PTL 1 (Japanese Patent Application Publication No. 2017-163511) describes that, when a moving body moves in a search area while observing a periphery by using a camera and a previously-determined feature portion is detected in an observation image of the camera, it is determined that a body to be searched is detected.

PTL 2 (Japanese Patent Application Publication No. 2022-47756) describes that, by using a peripheral image or the like of a moving body captured by a camera mounted on the moving body, three-dimensional map data used for unmanned aircraft flight are generated.

SUMMARY

In PTL 1 described above, there is a problem in that, when a face of a person is detected in an image being observed by a camera, processing of acquiring image data of a still image of the observation image is being executed, and therefore, it is necessary to acquire all images with accuracy enabling detecting a face of a person and perform processing on the acquired image, and as a result, efficiency is not increased. The technique in PTL 2 is not a technique for detecting a target object.

In view of the above-described problem, one example of an object of the present invention is to provide a detection system, a detection method, and a program that can efficiently perform detection of a target object using an image.

According to one aspect of the present invention, provided is a detection system including:

at least one memory configured to store instructions; and at least one processor configured to execute the instructions to perform operations comprising:

acquiring a first image, and a second image acquired by capturing an image of a narrower area than in the first image;

generating, by using the first image, map information;

determining a target area in the map information; and analyzing the second image acquired by capturing an image of the target area, and thereby detecting a target object.

According to one aspect of the present invention, provided is a detection method including, by one or more computers:

acquiring a first image, and a second image acquired by capturing an image of a narrower range than in the first image;

generating, by using the first image, map information;

determining a target area in the map information; and analyzing the second image acquired by capturing an image of the target area, and thereby detecting a target object.

According to one aspect of the present invention, provided is a non-transitory storage medium storing a program causing a computer to execute a detection method, the detection method including:

acquiring a first image, and a second image acquired by capturing an image of a narrower area than in the first image;

generating, by using the first image, map information;

determining a target area in the map information; and analyzing the second image acquired by capturing an image of the target area, and thereby detecting a target object.

According to one aspect of the present invention, a detection system, a detection method, and a program that can efficiently perform detection of a target object using an image can be provided.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 1 is a diagram illustrating an outline of a detection system according to a first example embodiment.

FIG. 2 is a diagram illustrating image capture of a first image and a second image according to the first example embodiment.

FIG. 3 is a block diagram illustrating a function configuration of the detection system according to the first example embodiment.

FIG. 5 is a diagram illustrating an outline of a detection method according to the first example embodiment.

EXAMPLE EMBODIMENT

Figure 4:
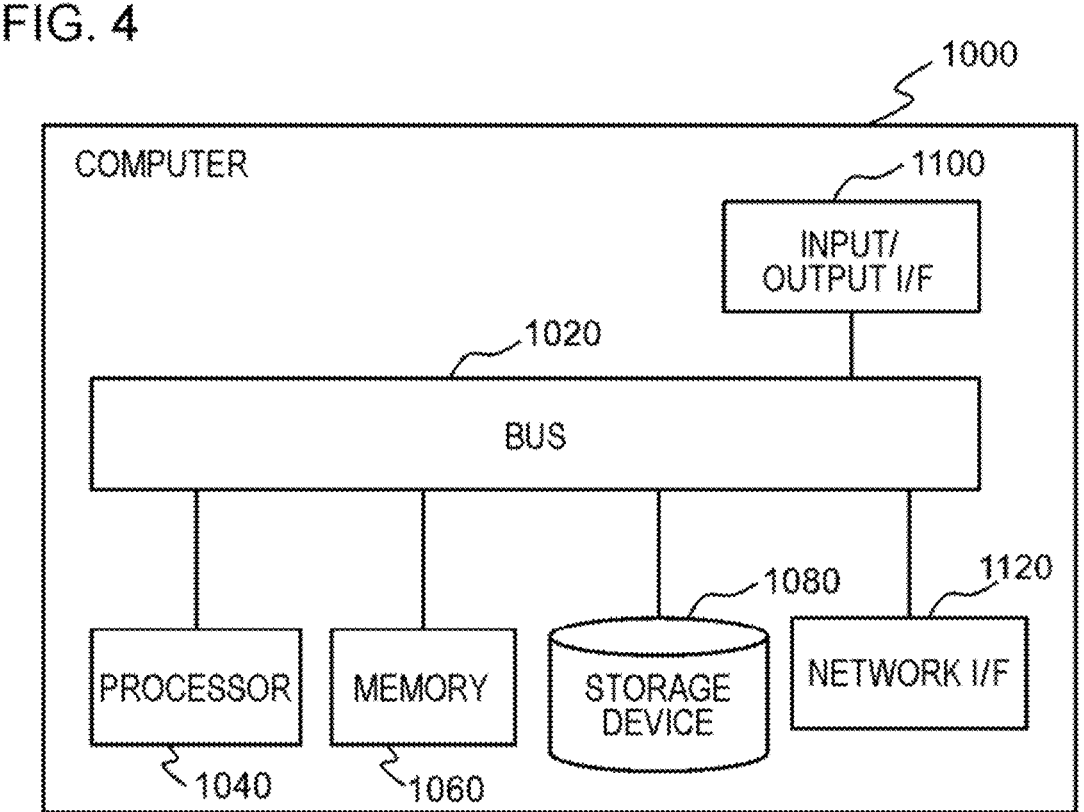
FIG. 4 is a diagram illustrating a computer used for achieving an acquisition unit, a map generation unit, a determination unit, and a detection unit.

The invention will be now described herein with reference to illustrative example embodiments. Those skilled in the art will recognize that many alternative example embodiments can be accomplished using the teachings of the present invention and that the invention is not limited to the example embodiments illustrated for explanatory purposes.

Example embodiments of the present invention will be described below by using drawings. Note that, in every drawing, a similar component is given a similar sign, and description thereof is omitted as appropriate.

First Example Embodiment

Figure 1:
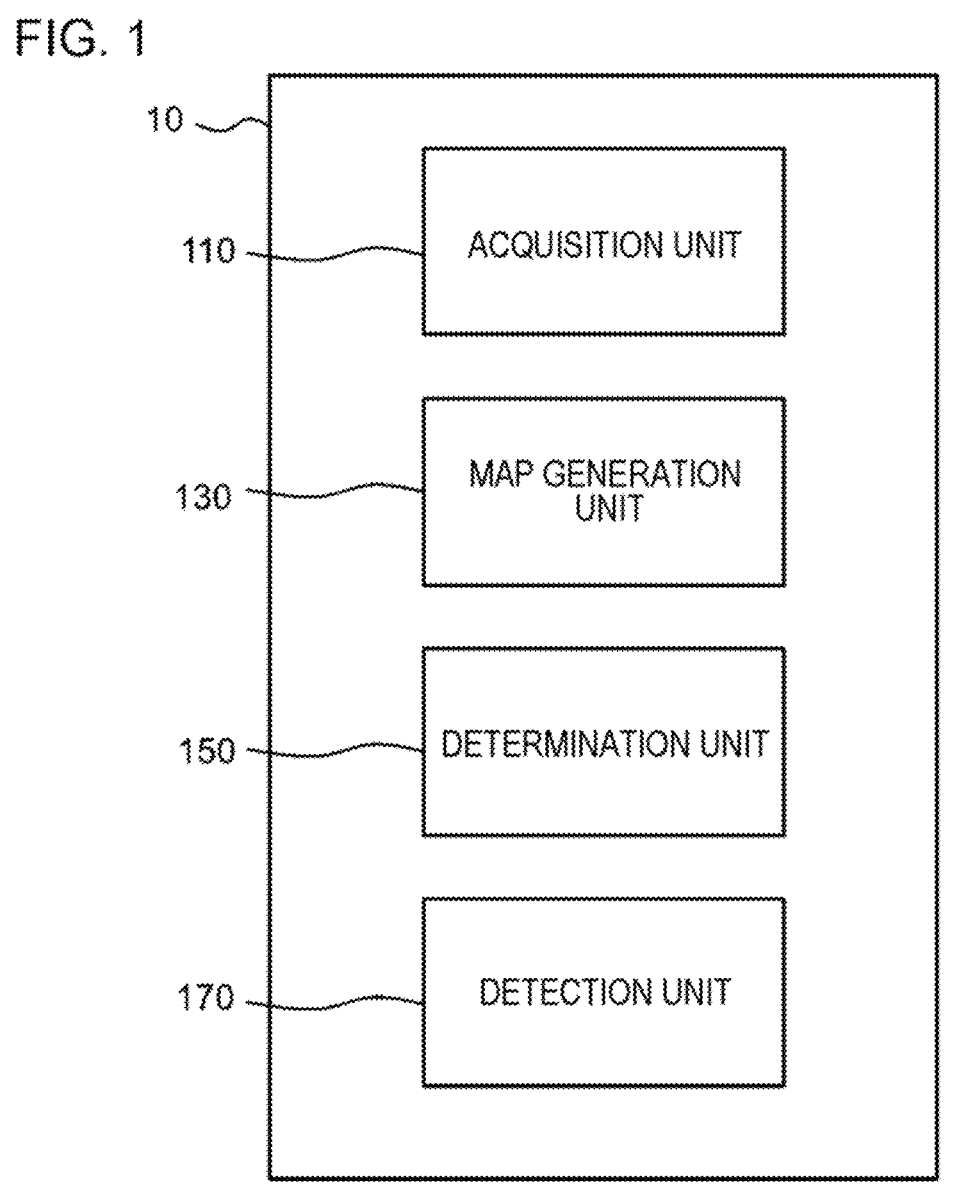

FIG. 1 is a diagram illustrating an outline of a detection system 10 according to a first example embodiment. The detection system 10 includes an acquisition unit 110, a map generation unit 130, a determination unit 150, and a detection unit 170. The acquisition unit 110 acquires a first image and a second image. The second image is an image acquired by capturing an image of a narrower area than in the first image. The map generation unit 130 generates, by using the first image, map information. The determination unit 150 determines a target area in the map information. The detection unit 170 analyzes the second image acquired by capturing an image of the target area, and thereby detects a target object.

According to the detection system 10, detection of a target object using an image can be efficiently performed.

Hereinafter, a detailed example of the detection system 10 is described.

The detection system 10 according to the present example embodiment detects a target object by using an image. Examples of the target object include, but specifically not limited to, a living object such as a person, a non-living object, and a still object. When the target object is a person, the target object may be any person, a person having a specific attribute, a specific individual, or the like. The detection system 10 detects a person, and thereby, can be used, for example, for missing person search in an accident in a mountain, a disaster, or the like. In addition, the target object may be belongings of a person. The detection system 10 detects belongings of a person such as a hazardous material, and thereby, can be used for security against a suspicious person or the like. The target object may be a face of a specific person. By doing so, for example, a specific missing person, a criminal, or the like can be detected.

Figure 2:
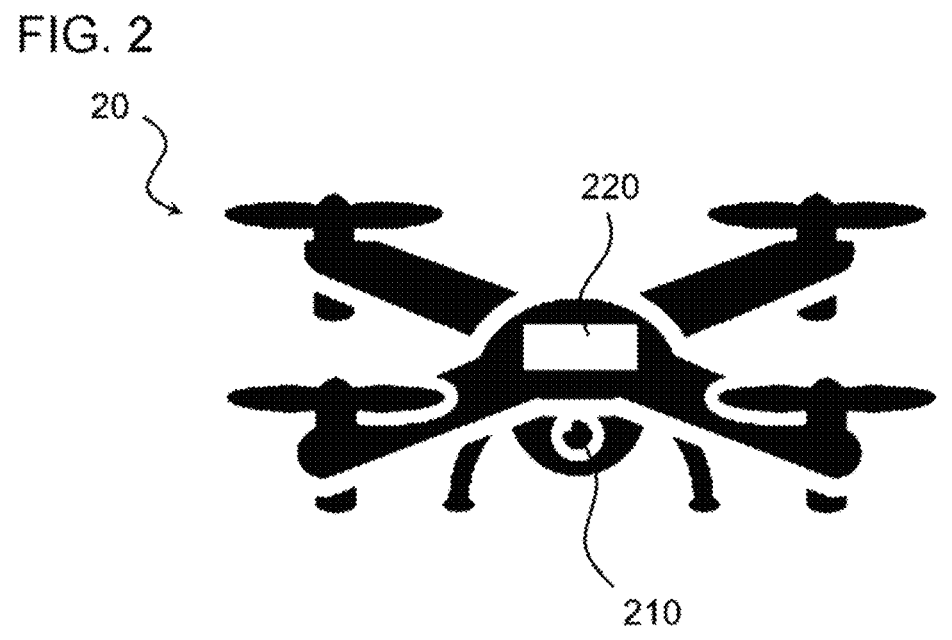

FIG. 2 is a diagram illustrating image capture of a first image and a second image according to the present example embodiment. The first image according to the present example embodiment is, for example, an image captured by a camera 210 mounted on a moving body 20. Further, the second image is, for example, an image captured by the camera 210 mounted on the moving body 20. However, at least either of the first image and the second image may not necessarily be an image captured by the camera 210 mounted on the moving body 20. At least either of the first image and the second image, for example, may be an image captured by a camera 210 a location of which is fixed, or may be an image captured by a camera 210 carried by a person. Hereinafter, an example in which each of the first image and the second image is an image captured by the camera 210 mounted on the moving body 20 is described.

In the example in FIG. 2, the moving body 20 is a flying body. In the example in FIG. 2, the moving body 20 is specifically a drone. However, the moving body 20 is not limited to a flying body, and may be a vehicle or the like traveling on a ground surface. While the moving body 20 moves, the camera 210 can capture an image of a periphery of the moving body 20. Preferably, the camera 210 continuously captures a plurality of images while the moving body 20 moves, in such a way as to be capable of capturing images of a whole of an area to be searched. Any relation among image capture timings of a plurality of cameras 210 is applicable.

Movement of the moving body 20 may be controlled by an operator, or may be automatically controlled. When the movement of the moving body 20 is controlled by an operator, the moving body 20 may be remotely operated, or may be operated by an operator in the moving body 210. When the movement of the moving body 20 is automatically controlled, for example, an area or a route where the moving body 210 should move is set. Note that, an area to be moved is set, and thereby a route may be automatically set. Further, control for image capture based on the camera 210 may be performed by an operator of the camera 210, or may be automatically performed in cooperation with movement of the moving body 20. When control for image capture based on the camera 210 is performed by an operator of the camera 210, the camera 210 may be remotely operated, or may be operated by an operator in the moving body 20.

In the example in FIG. 2, the moving body 20 is mounted with one or more cameras 210 and a control unit 220. The control unit 220 can control movement of the moving body 20 and the camera 210.

As described above, a second image is an image acquired by capturing an image of a narrower area than in a first image. The first image and the second image may be images captured under image capture conditions different from each other in the same camera 210. Alternatively, the first image and the second image may be images captured by cameras 210 different from each other.

An angle of view of a camera 210 capturing the second image is set as being smaller than an angle of view of a camera 210 capturing the first image. For example, when same areas images of which are captured are compared, the second image is captured with higher definition than the first image. The second image is an image acquired by capturing an image of a narrower area than in the first image, but may be an image capable of detecting a target object with higher accuracy.

In general, an image acquired by capturing an image of a narrow area with a smaller angle of view captures a target with higher definition. However, in such an image, an image-capturable area is narrow. Therefore, when a target object is intended to be detected from a wide investigation area, it is necessary to process many images, and as a result, it is difficult to increase efficiency.

The detection system 10 according to the present example embodiment determines, by using a first image, a target area to be noticed, analyzes a second image acquired by capturing an image of the target area, and thereby detects a target object. Therefore, compared with a case where a second image for all areas is analyzed, a target object can be efficiently detected.

When the moving body 20 is mounted with one or more cameras 210, the one or more cameras 210 can include a first camera 210 and a second camera 210. The first camera 210 and the second camera 210 are cameras different from each other. Then, an image captured by the first camera 210 can be designated as a first image, and an image captured by the second camera 210 can be designated as a second image. Note that, the first image and the second image each may be an image configuring a moving image, i.e., a frame image.

The first camera 210 is suitable, for example, for capturing a far image with a large angle of view. The first camera 210 can be also referred to as a long-distance camera. An angle of view of the first camera 210 may be equal to or more than 180°, and may be 360°. The second camera 210 is suitable for capturing a near image with a smaller angle of view than in the first camera 210. The second camera 210 can be also referred to as a near-distance camera. A focal distance of the first camera 210 may be longer than a focal distance of the second camera 210. The first camera 210 and the second camera 210 may be disposed adjacently to each other, or may be disposed separately from each other. An image capture direction of the first camera 210 and an image capture direction of the second camera 210 may be different from each other, or may be the same.

Preferably, the moving body 20 is mounted with a plurality of cameras 210 in a state where forward and backward directions of the moving body 20 can be subjected to image capture, and more preferably, a plurality of cameras 210 are mounted in a state where forward, backward, right, and left directions of the moving body 20 can be subjected to image capture. A reason is that by doing so, while the moving body 20 moves, images of a peripheral object can be captured from a plurality of directions. When the moving body 20 is mounted with the first camera 210 and the second camera 210, preferably, the moving body 20 is mounted with a plurality of first cameras 210 in the state where forward and backward directions of the moving body 20 can be subjected to image capture, and more preferably, a plurality of first cameras 210 are mounted in the state where forward, backward, right, and left directions of the moving body 20 can be subjected to image capture. Further, preferably, the moving body 20 is mounted with a plurality of second cameras 210 in the state where forward and backward directions of the moving body 20 can be subjected to image capture, and more preferably, a plurality of second cameras 210 are mounted in the state where forward, backward, right, and left directions of the moving body 20 can be subjected to image capture. When the moving body 20 is a flying body, the moving body 20 is preferably mounted with one or more cameras 210 in a state where a lower direction of the moving body 20 can be further subjected to image capture.

Each image captured by the camera 210 is associated with information indicating an image capture location and information indicating an image capture direction. Each image may be further associated with information indicating an image capture date and time. When the moving body 20 is a flying body, each image is further associated with information indicating altitude. The moving body 20 or each camera 210 includes a receiver of a global navigation satellite system (GNSS), and the control unit 220 acquires, by using the GNSS, information (latitude, longitude, and the like) indicating an image capture location, and associates the information with each image. Further, the moving body 20 or each camera 210 includes an azimuth sensor, and the control unit 220 can acquire, from the azimuth sensor, information indicating an image capture direction (azimuth or the like), and associate the information with each image. The moving body 20 includes an altitude sensor, and the control unit 220 can acquire, from the altitude sensor, information indicating altitude, and associate the information with each image. However, information indicating an image capture location, information indicating an image capture direction, information indicating an image capture date and time, and information indicating altitude may be associated with an image in each camera 210.

FIG. 3 is a block diagram illustrating a function configuration of the detection system 10 according to the present example embodiment. In the example in FIG. 3, the detection system 10 further includes the moving body 20 and one or more cameras 210. Further, in the example in FIG. 3, the detection system 10 includes a detection apparatus 100 including the acquisition unit 110, the map generation unit 130, the determination unit 150, and the detection unit 170. At least either of the camera 210 and the control unit 220 of the moving body 20, and the detection apparatus 100 are communicable with each other, based on wireless connection or wired connection. However, the configuration of the detection system 10 is not limited to the present example.

Hereinafter, each function configuration unit of the detection system 10 is described in detail. In the example in FIG. 3, the detection system 10 further includes a first image storage unit 101 and a second image storage unit 102. However, the first image storage unit 101 and the second image storage unit 102 may be disposed outside the detection system 10. The acquisition unit 110 stores an acquired first image in the first image storage unit 101. Further, the acquisition unit 110 stores an acquired second image in the second image storage unit 102. Note that, both the first image and the second image may be stored in one storage unit. The acquisition unit 110 may acquire a generated image every time a first image or a second image is generated by the camera 210, or may collectively acquire a plurality of images.

The acquisition unit 110 can acquire, for example, from one or more cameras 210, a first image and a second image. However, the acquisition unit 110 may acquire at least either of the first image and the second image from another apparatus or a storage unit. The acquisition unit 110 acquires at least a plurality of second images. Preferably, the acquisition unit 110 also acquires a plurality of first images. As described below, the detection unit 170 according to the present example embodiment extracts a second image to be analyzed, from a plurality of second images acquired by the acquisition unit 110. Then, the detection unit 170 analyzes the extracted second image, and thereby detects a target object.

The map generation unit 130 generates, by using a first image, map information including information of a type and a location of an object. In the example in FIG. 3, the detection system 10 further includes an object storage unit 103. The object storage unit 103 previously stores a predetermined feature value for each type of an object. The type of an object may include, for example, a landform such as a river, a precipice, and a mountain, in addition to a thing such as a building, a tree, a person, and an animal. Further, the type of an object may include an article such as a shoe and a bag. The map generation unit 130 reads a first image from the first image storage unit 101, and executes matching processing for the first image, by using each feature value stored in the object storage unit 103. Then, a type of an object having the highest degree of matching is determined as a type of an object included in the first image.

Further, the map generation unit 130 determines a location, on a map, of an object in a first image in which a type of the object is determined. The map generation unit 130 can determine the location of the object on the map, by using information indicating an image capture location associated with the first image, information indicating an image capture direction, an angle of view of the camera 210 capturing the first image, and a location and a size of the object in the first image. The map generation unit 130 executes such processing for each first image acquired by the acquisition unit 110, and determines a type and a location of an object. The map generation unit 130 generates map information in which types and locations of one or more determined objects are mapped. Note that, the map generation unit 130 may acquire previously-prepared reference map information, add, to the reference map information, information of types and locations of one or more determined objects or modify the reference map information, and thereby generate map information. In the example in FIG. 3, the detection system 10 further includes a map storage unit 104, and the map generation unit 130 can read and use reference map information previously-stored in the map storage unit 104. The reference map information may be two-dimensional map information.

Further, when an object (clothes of a person, an article left behind, or the like) related to a target object to be detected is previously determined as a target, a feature value of the target can be stored in the object storage unit 103. Then, the map generation unit 130 executes, by using the feature value of the target, matching processing for a first image. As a result of the matching processing, the map generation unit 130 may provide, in map information, information indicating that a possibility of a target is high, for an object in which a degree of matching with the feature value of the target is equal to or more than a previously-determined reference.

Further, the map generation unit 130 can decide, by executing processing for a plurality of time-series first images, whether each object is moving. When, for example, a location, on a map, of an object determined as described above is changing with a lapse of time, it is decided that the object is moving. Further, the map generation unit 130 decides, by executing processing for a plurality of time-series first images, whether a shape of each object is changing. The map generation unit 130 decides, when a shape of an object is changing with a lapse of time, that the object is moving. On the other hand, when a location on a map or a shape, of a determined object does not change with a lapse of time, it is decided that the object is not moving. The map generation unit 130 may provide, for example, in map information, information indicating that a possibility of being moving is high, for an object decided as being moving.

Note that, the map generation unit 130 may determine, by using a model previously generated based on machine learning, a type and a location of an object. The map generation unit 130 inputs, to the model, for example, a first image and information associated with the first image, and acquires, as output of the model, types and locations of one or more objects included in the first image.

Note that, the map generation unit 130 may derive, for each object included in a first image, a "degree of certainty of a type of an object". When the map generation unit 130 executes the above-described matching processing and determines a type of an object, a degree of matching in matching processing can be referred to as a "degree of certainty of a type of an object". Further, when the map generation unit 130 determines, by using a model generated based on machine learning, a type of an object, by using a model in which a likelihood with respect to each type of an object is included in output, the likelihood can be handled as a "degree of certainty of a type of an object". Note that, the likelihood is a likelihood in which an object of the type is included in the first image. The map generation unit 130 further includes, in map information, information indicating a degree of certainty of a determined type, with respect to each object in which a type and a location are determined.

Further, when an object in which a "degree of certainty of a type of an object" is low is included in a first image, the first image may be notified. Specifically, the map generation unit 130 outputs, when a derived "degree of certainty of a type of an object" is lower than a predetermined reference, as an image to be directly checked by a user, a first image including the object to a display or the like visible by a user. In a display image, an object having a low "degree of certainty of a type of an object" is indicated in a state of being discriminable from another object. A user decides a type of the object, and inputs the decided type to the detection system 10. The map generation unit 130 includes, in map information, the input type as a type of the object.

The determination unit 150 acquires map information generated by the map generation unit 130. Then, a target area in the map information is determined. The target area is an area where priority for executing detection processing with respect to a target object is particularly high. Specifically, examples of the target area include an area where a possibility of presence of a target object is high, an area where a target object should be found early (e.g., an area where there is concern about a secondary disaster), and an area where it is difficult to search a target object based on direct access by a person. A first example to a fifth example of a method of determining a target area by using the determination unit 150 are described below. The determination unit 150 may use any one of the methods of the first example to the fifth example, or may use a method in which two or more methods are combined. In other words, the determination unit 150 may determine, as a target area, an area decided as being a target area by using at least any one of the methods of the first example to the fifth example. Further, the determination unit 150 may determine a plurality of target areas. However, the method of determining a target area is not limited to the first example to the fifth example.

First Example

In the first example, the determination unit 150 detects a difference between map information and previously-stored reference map information, and determines a target area, based on the detection result. The reference map information is acquired, through a communication network, for example, from a server or the like of a map information providing service, and is stored in the map storage unit 104. The determination unit 150 can read reference map information from the map storage unit 104, and use the read reference map information. Map information generated by the map generation unit 130 by using a first image can be referred to as information newer than the reference map information. Herein, when, for example, a building indicated in the reference map information is not included in the map information generated by the map generation unit 130, there is a possibility in that the building has collapsed due to a disaster or the like. Further, in a location indicated as a mountain in the reference map information, when there is no tree in the map information, there is a possibility in that a landslide has occurred in the location. In this manner, an area where there is a difference between the map information generated by the map generation unit 130 and the reference map information can be referred to as an area to be especially noticed in a scene of search caused by a disaster or an accident. In the first example, the determination unit 150 detects a difference from previously-stored reference map information, and determines, as a target area, an area where the difference is detected.

Second Example

In the second example, the map generation unit 130 derives, as described above, a "degree of certainty of a type of an object" with respect to each object included in a first image. The determination unit 150 determines a target area, based on a "degree of certainty of a type of an object" determined by using the first image. When, for example, a color of a mountain included in the first image is not a color of a tree but ocher due to occurrence of a landslide, it is conceivable that a degree of certainty in that the mountain is a mountain is decreased. Further, when a building is overlapped with flame and smoke in the first image due to fire or the like, it is conceivable that a degree of certainty in that the building is a building is decreased. In this manner, in an object in which a "degree of certainty of a type of an object" derived by the map generation unit 130 is low, or in a periphery of the object, there is a high possibility in that any emergency state is occurring. Therefore, as in the second example, based on a "degree of certainty of a type of an object" determined by using the first image, a target area is effectively determined.

In the second example, the determination unit 150 decides whether a degree of certainty of a type of each object indicated in map information is lower than a predetermined reference. When the degree of certainty of a type of an object is lower than the predetermined reference, the determination unit 150 determines an area including the object as a target area. When the degree of certainty of a type of an object is equal to or more than the predetermined reference, the determination unit 150 may not necessarily determine an area including the object as a target area.

Third Example

In the third example, the map generation unit 130 decides whether each object is moving, as described above. Then, the determination unit 150 determines a target area, based on presence/absence of a moving object. The determination unit 150 can determine, as a target area, an area including an object provided with information indicating, in map information, that there is a high possibility of being moving. By doing so, a target area including a person who is moving and a person who is waving a hand for help can be determined.

Fourth Example

In the fourth example, as described above, a target is previously determined, and information indicating that a possibility of a target is high is provided in map information. Then, the determination unit 150 determines, as a target area, an area including an object provided with information indicating, in map information, that a possibility of a target is high. By doing so, for example, a periphery of a target to be noticed such as a person with specific clothes and an article left behind or the like such as a shoe can be efficiently searched.

Fifth Example

In the fifth example, the determination unit 150 determines, based on map information, a location less accessible by a person as a target area. For example, information, such as under a precipice and deep in a forest, indicating a type of a predetermined object and a location relation with the object is previously determined. Then, the determination unit 150 determines, from the map information, an object of the predetermined type, and determines, as a target area, an area having a location relation determined for the object. By doing so, a location less accessible by a person can be preferentially searched by using an image.

Note that, in each example described above, a size and a shape of a target area are optional. As an example, a size of the target area can be equal to or more than 1 m$^2$ and equal to or less than 25 m$^2$. Further, as an example, a shape of the target area is a square, a rectangle, or a circle. Note that, with respect to each determination method for a target area, a size or a shape of the target area may differ.

The detection unit 170 analyzes a second image acquired by capturing an image of a target area, and thereby detects a target object. Hereinafter, detailed description is made. The detection unit 170 acquires, from the determination unit 150, information indicating a target area. Then, according to the present example embodiment, the detection unit 170 extracts, from among second images stored in the second image storage unit 102, a second image in which at least a part of the image capture area and at least a part of the target area are overlapped with each other. The detection unit 170 may extract a plurality of second images. The detection unit 170 can determine an image capture area of the second image in map information, by using information indicating an image capture location associated with each second image, information indicating an image capture direction, and an angle of view of the camera 210 capturing the second image. Then, the detection unit 170 decides whether at least a part of the image capture area of the second image and at least a part of the target area are overlapped with each other.

The detection unit 170 executes, by using information of a target object previously input to the detection system 10, processing of detecting a target object in the second image. Information of the target object may be, for example, a feature value of the target object, or an image of the target object. The detection unit 170 executes, for example, by using information of the target object, matching processing for the second image, and thereby detects the target object.

Note that, the detection unit 170 executes detection processing (analysis) for an extracted second image, and thereafter, may further execute detection processing (analysis) for a second image having been not extracted. Even in this case, when a second image acquired by capturing an image of a target area is preferentially analyzed, a possibility in that a target object can be detected early is increased.

The detection unit 170 outputs, when detecting a target object in a second image, the second image to a display visible by a user. Herein, the detection unit 170 may display, on the display, a second image superimposed with a graphic surrounding the detected target object. The detection unit 170 may further output, on the display visible by a user, information indicating a location of the detected target object, for example, a map. Further, the detection unit 170 may output a notification sound indicating that a target object is detected.

The detection system 10 may output, to the display, map information generated by the map generation unit 130 in such a way as to be further displayed. Herein, the map information may be displayed on the display in a state where a portion different from reference map information is discriminable from another portion. Further, an area an image of which is captured based on only a first image and an area an image of which is captured based on a second image may be displayed with colors different from each other.

A hardware configuration of the detection system 10 is described below. The acquisition unit 110, the map generation unit 130, the determination unit 150, and the detection unit 170 of the detection system 10 may be achieved by hardware (e.g., a hard-wired electronic circuit) achieving each of the acquisition unit 110, the map generation unit 130, the determination unit 150, and the detection unit 170, or may be achieved by a combination of hardware and software (e.g., a combination of an electronic circuit and a program controlling the electronic circuit, or the like). Hereinafter, a case where each of the acquisition unit 110, the map generation unit 130, the determination unit 150, and the detection unit 170 of the detection system 10 is achieved by a combination of hardware and software is further described.

FIG. 4 is a diagram illustrating a computer 1000 used for achieving the acquisition unit 110, the map generation unit 130, the determination unit 150, and the detection unit 170. The computer 1000 is any computer. The computer 1000 is, for example, a system on chip (SoC), a personal computer (PC), a server machine, a tablet terminal, a smartphone, or the like. The computer 1000 may be a dedicated computer designed for achieving the detection apparatus 100, or a general-purpose computer.

The acquisition unit 110, the map generation unit 130, the determination unit 150, and the detection unit 170 may be achieved by one computer 1000, or may be achieved by a combination of a plurality of the computers 1000. When the acquisition unit 110, the map generation unit 130, the determination unit 150, and the detection unit 170 are achieved by one computer 1000, the computer 1000 may be mounted on the moving body 20, or may be disposed away from the moving body 20. Further, when the acquisition unit 110, the map generation unit 130, the determination unit 150, and the detection unit 170 are achieved by a combination of a plurality of the computers 1000, one or more of the plurality of computers 1000 may be mounted on the moving body 20. Further, one or more of the plurality of computers 1000 may be disposed away from the moving body 20. A computer 1000 provided for the moving body 20 may double as a computer 1000 for achieving the control unit 220 to be described later.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit/receive data to/from one another. However, a method of mutually connecting the processor 1040 and the like is not limited to bus connection. Examples of the processor 1040 include various types of processors such as a central processing unit (CPU), a graphics processing unit (GPU), or a field-programmable gate array (FPGA). The memory 1060 is a main storage device achieved by using a random access memory (RAM) or the like. The storage device 1080 is an auxiliary storage device achieved by using a hard disk, a solid state drive (SSD), a memory card, a read only memory (ROM), or the like.

The input/output interface 1100 is an interface for connecting the computer 1000 and an input/output device. The input/output interface 1100 is connected to, for example, an input apparatus such as a keyboard and an output apparatus such as a display. A method of connecting to the input apparatus and the output apparatus based on the input/output interface 1100 may be wireless connection, or may be wired connection.

The network interface 1120 is an interface for connecting the computer 1000 to a network. The communication network is, for example, a local area network (LAN) or a wide area network (WAN). A method of connecting to a network based on the network interface 1120 may be wireless connection, or may be wired connection.

The storage device 1080 stores a program module achieving each of the acquisition unit 110, the map generation unit 130, the determination unit 150, and the detection unit 170 of the detection system 10. The processor 1040 reads each of the program modules onto the memory 1060 and executes the read program module, and thereby achieves a function relevant to each of the program modules.

Further, when the first image storage unit 101, the second image storage unit 102, the object storage unit 103, and the map storage unit 104 are disposed inside the detection system 10, the first image storage unit 101, the second image storage unit 102. The object storage unit 103, and the map storage unit 104 are achieved, for example, by using the storage device 1080. However, one or more of the first image storage unit 101, the second image storage unit 102, the object storage unit 103, and the map storage unit 104 may be disposed outside the detection system 10.

A hardware configuration of a computer for achieving the control unit 220 of the moving body 20 is illustrated, for example, by FIG. 4, similarly to the acquisition unit 110, the map generation unit 130, the determination unit 150, and the detection unit 170. However, a program module for achieving a function of the control unit 220 according to the present example embodiment is further stored in the storage device 1080 of the computer 1000 for achieving the control unit 220 according to the present example embodiment.

FIG. 5 is a diagram illustrating an outline of a detection method according to the present example embodiment. The detection method according to the present example embodiment is executed by one or more computers. The detection method according to the present example embodiment includes an acquisition step S101, a generation step S102, a determination step S103, and a detection step S104. In the acquisition step S101, a first image and a second image acquired by capturing an image of a narrower area than in the first image are acquired. In the generation step S102, map information is generated by using the first image. In the determination step S103, a target area in the map information is determined. In the detection step S104, the second image acquired by capturing an image of the target area is analyzed, and thereby a target object is detected.

The detection method according to the present example embodiment can be achieved by the detection system 10 according to the present example embodiment.

As described above, according to the present example embodiment, the map generation unit 130 generates, by using a first image, map information. The determination unit 150 determines a target area in the map information. Then, the detection unit 170 analyzes a second image acquired by capturing an image of the target area, and thereby detects a target object. Therefore, detection of a target object using an image can be efficiently performed.

Second Example Embodiment

Figure 6:
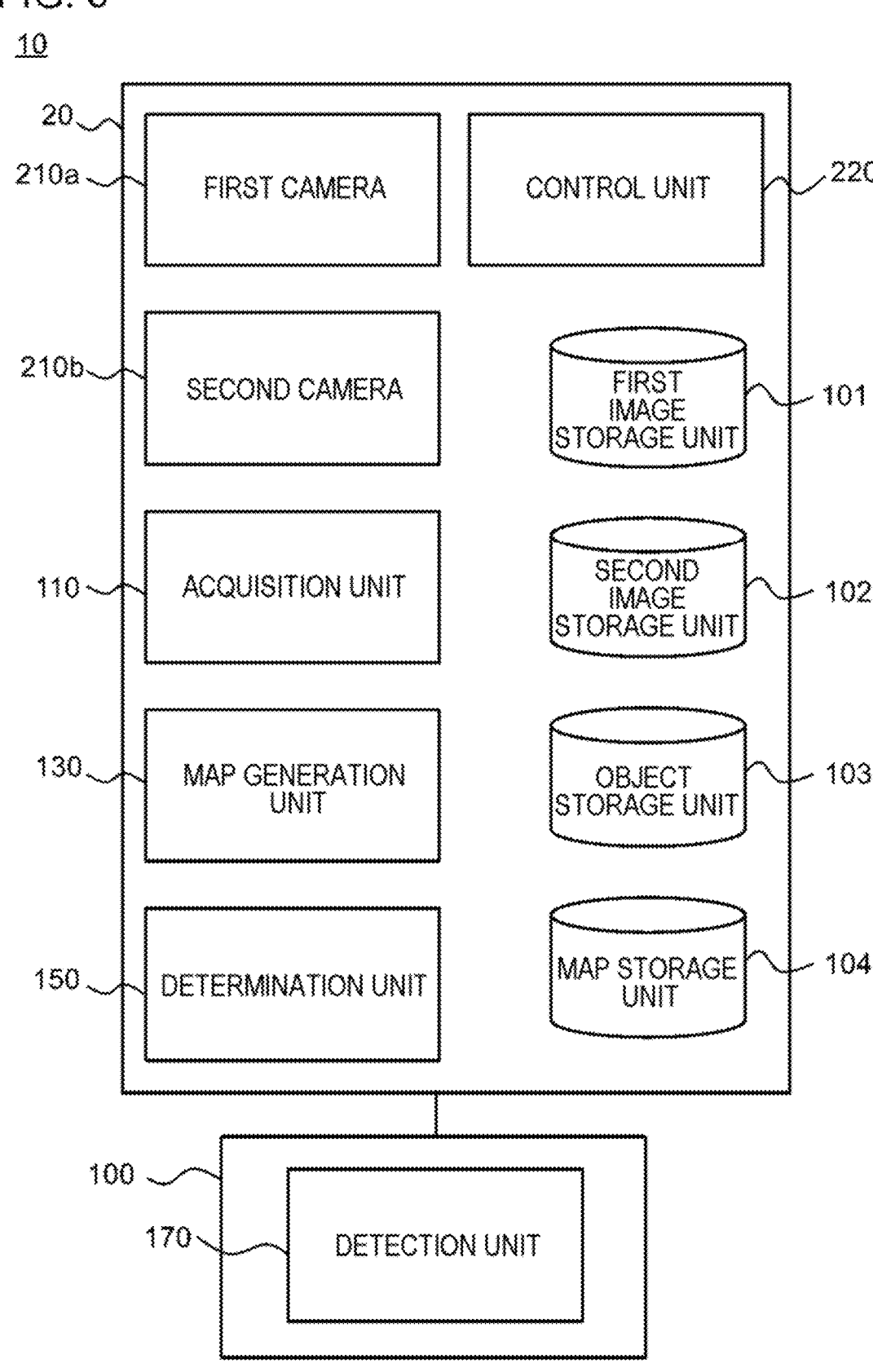
FIG. 6 is a block diagram illustrating a function configuration of a detection system according to a second example embodiment.

FIG. 6 is a block diagram illustrating a function configuration of a detection system 10 according to a second example embodiment. The detection system 10 according to the present example embodiment is the same as the detection system 10 according to the first example embodiment, except points described below. The detection system 10 according to the second example embodiment includes a moving body 20 and a control unit 220 that controls one or more cameras 210. The control unit 220 moves, based on map information, the moving body 20. Further, the control unit 220 causes at least any of the one or more cameras 210 to capture an image of a target area and thereby generate a second image.

In an example in FIG. 6, an acquisition unit 110, a map generation unit 130, a determination unit 150, a first image storage unit 101, a second image storage unit 102, an object storage unit 103, and a map storage unit 104 are mounted on the moving body 20. Then, a detection unit 170 is included in a detection apparatus 100 disposed separately from the moving body 20. The detection apparatus 100 and the control unit 220 of the moving body 20 are communicable with each other, based on wireless connection or wired connection. However, a configuration of the detection system 10 according to the present example embodiment is not limited to the present example.

In the detection system 10 according to the present example embodiment, the acquisition unit 110 acquires a first image and a second image from one or more cameras 210 mounted on the moving body 20. In the example in FIG. 6, the detection system 10 includes, as the camera 210, a first camera 210*a* and a second camera 210*b*. The first camera 210*a* and the second camera 210*b* each are similar to the first camera 210 and the second camera 210 described according to the first example embodiment. In the following, an example in which the detection system 10 includes the first camera 210*a* and the second camera 210*b* is described, but as described according to the first example embodiment, a first image and a second image may be captured by switching an image capture condition of the same camera 210.

Figure 7:
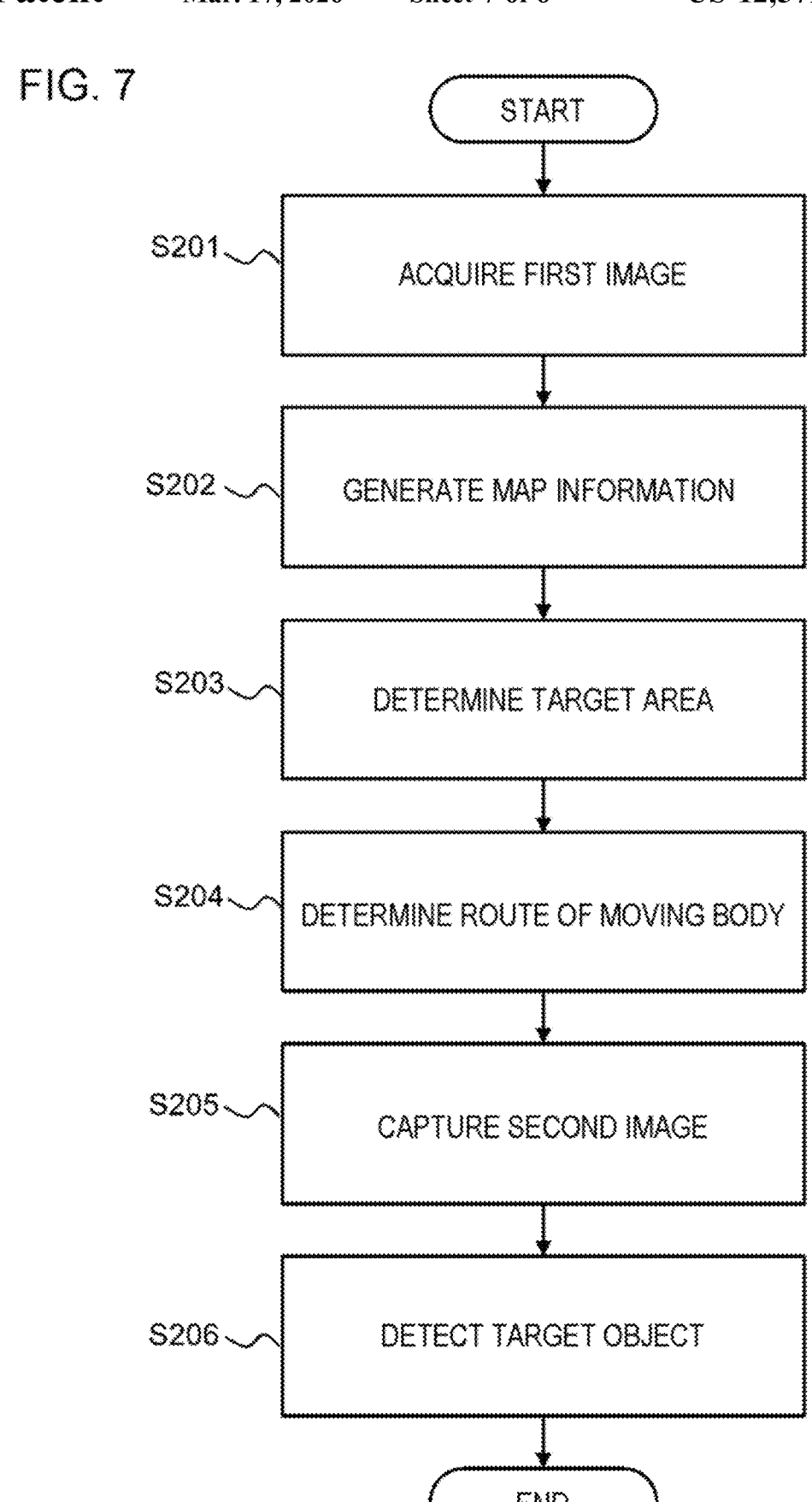
FIG. 7 is a flowchart illustrating a flow of processing of the detection system according to the second example embodiment.

FIG. 7 is a flowchart illustrating a flow of processing of the detection system 10 according to the present example embodiment. A moving route of the moving body 20 according to the present example embodiment is controlled by the control unit 220. First, in the moving body 20, a first image is captured by using the first camera 210*a*, and the acquisition unit 110 acquires the captured first image (S201). Then, similarly to the description according to the first example embodiment, the map generation unit 130 generates map information by using the first image (S202), and the determination unit 150 determines a target area (S203). When the target area is determined, the control unit 220 determines, based on the map information, a moving route of the moving body 20 in such a way that the second camera 210*b* can capture an image of the target area (S204). Then, the control unit 220 controls the moving body 20 in such a way as to move the moving body 20 by following the determined moving route. When the moving body 20 arrives at a location where an image of the target area can be captured by the second camera 210*b*, the control unit 220 captures, by using the second camera 210*b*, a second image including the target area (S205). The acquisition unit 110 acquires the captured second image, and the detection unit 170 analyzes the second image acquired by the acquisition unit 110 and thereby detects a target object (S206).

In this manner, the control unit 220 according to the present example embodiment moves, based on map information, the moving body 20. Further, the control unit 220 causes at least any of one or more cameras 210 to capture an image of a target area and thereby generate a second image. Therefore, compared with a case where an image is randomly captured in a previously-determined route, a second image acquired by effectively capturing an image of a target area is acquired easily. In other words, a target area is determined and thereafter, an image of the target area is captured, and therefore a desired number of second images can be acquired, and in addition, images of the target area can be captured without omission.

With reference to FIG. 6, the detection system 10 according to the present example embodiment is described below in detail.

In the detection system 10 according to the present example embodiment, first, the control unit 220 causes moving body 20 to move in a previously-determined route. The previously-determined route is, for example, a route in which raster scanning is performed within a search area. Then, the control unit 220 causes, while moving the moving body 20, the first camera 210*a* to capture a first image. In order to acquire more images, in addition to the first image, a second image may be captured by the second camera 210*b*, but at that time, the second image may not necessarily be captured.

The acquisition unit 110 acquires the first image from the first camera 210*a*, and stores the acquired first image in the first image storage unit 101. When in addition to the first image, the second image is captured, the acquisition unit 110 may acquire the second image from the second camera 210*b*, and store the acquired second image in the second image storage unit 102.

Processing executed by the map generation unit 130 and the determination unit 150 according to the second example embodiment is the same as in the map generation unit 130 and the determination unit 150 according to the first example embodiment.

The control unit 220 determines, based on the generated map information and the determined target area, a next moving route of the moving body 20. Specifically, a location and a range of a target area in map information are determined, and a moving route is determined in such a way that the moving body 20 moves toward the target area, and then, the moving body 20 moves in the target area or in a periphery of the target area. Herein, when a three-dimensional object (a tree, a building, or the like) is present in the target area, a moving route is preferably determined in such a way as to move around the object once or more, in order to enable an image of the object to be captured from a plurality of directions. Further, a moving route is preferably determined in such a way as to move also in a height direction along the three-dimensional object. By doing so, image capture omission in the target area can be reduced. When the moving body 20 is a flying body, the control unit 220 may determine a moving route, for example, in such a way as to spirally move around an object being a factor for determining the target area in the first example to the fifth example of the method of determining a target area described according to the first example embodiment. Further, the control unit 220 may determine a moving route in such a way as to gradually separate from an object being a factor for determining the target area while circling the object around the object as the center.

When a moving route is determined, the control unit 220 moves the moving body 20 according to the moving route. Then, the second camera 210*b* is caused to be captured an image of the target area. The control unit 220 preferably causes the second camera 210*b* to capture a plurality of second images with as few image capture omissions as possible.

The acquisition unit 110 acquires the second image acquired by capturing the image of the target area by the second camera 210*b*. Then, the determination unit 150 analyzes the second image and thereby detects a target object, as described according to the first example embodiment.

Next, an advantageous effect according to the present example embodiment is described. According to the present example embodiment, an advantageous effect similar to that of the first example embodiment is acquired. In addition, the control unit 220 according to the present example embodiment moves, based on map information, the moving body 20. Further, the control unit 220 causes at least any of one or more cameras 210 to capture an image of a target area and thereby generate a second image. Therefore, compared with a case where an image is randomly captured in a previously-determined route, a second image acquired by effectively capturing an image of a target area is acquired more efficiently.

Third Example Embodiment

A detection system 10 according to a third example embodiment is the same as the detection system 10 according to at least either of the first and second example embodiment, except points described blow. In the detection system 10 according to the present example embodiment, a map generation unit 130 determines, by using a second image, a three-dimensional shape of an object, adds the determined shape to map information, and generates three-dimensional map information. Detailed description is made below.

Figure 8:
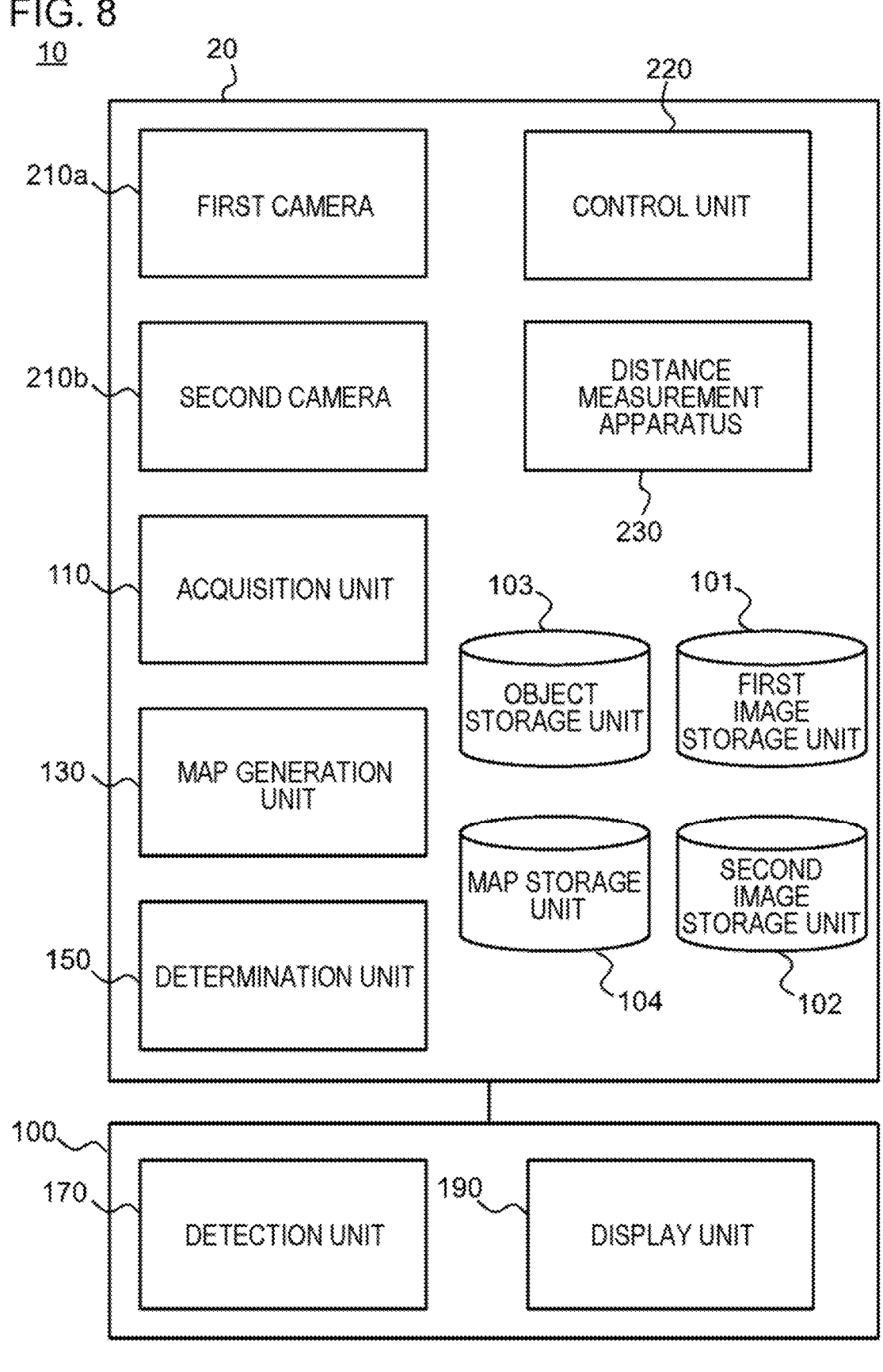
FIG. 8 is a block diagram illustrating a configuration of a detection system according to a third example embodiment.

FIG. 8 is a block diagram illustrating a configuration of the detection system 10 according to the present example embodiment. In an example in FIG. 8, the detection system 10 includes a distance measurement apparatus 230. The distance measurement apparatus 230 is, for example, an infrared radar, a light detection and ranging (LiDAR), or a stereo camera, and is mounted on a moving body 20. According to the distance measurement apparatus 230, distance measurement from the moving body 20 to each point of an object surface can be performed, and thereby three-dimensional information of the object is acquired. The detection system 10 may include a plurality of distance measurement apparatuses 230. However, the detection system 10 according to the present example embodiment may not necessarily include the distance measurement apparatus 230. Further, a detection apparatus 100 includes a display unit 190. The display unit 190 is, for example, a display.

An acquisition unit 110 according to the present example embodiment further acquires a measurement result based on the distance measurement apparatus 230. A map generation unit 130 determines, by using the measurement result based on the distance measurement apparatus 230, at least either of a three-dimensional shape and a distance of an object, adds a determination result to map information, and generates three-dimensional map information.

When, for example, the moving body 20 is a flying body, the moving body 20 three-dimensionally flies while avoiding an object such as a tree, and thereby, efficiently acquires a second image. On the other hand, it can be also said that, when an image is captured with approach to an object to some extent, a second image suitable for target object detection is acquired. In order to balance these two matters, a three-dimensional shape of an object is preferably acquired correctly as much as possible. According to the present example embodiment, three-dimensional map information is generated, and thereby a location safely accessible by the moving body 20 and an inaccessible location are further clarified. As a result, the moving body 20 can accurately move to a safely-accessible location, and thereby, capture more second images which are effective. Further, a location inaccessible by the moving body 20 can be recognized, for example, as a location required to be directly confirmed by a person.

The map generation unit 130 according to the present example embodiment determines, by using a second image, a three-dimensional shape of an object determined by using a first image. Herein, the second image used for determining a three-dimensional shape by the map generation unit 130 may be an image captured before determination of a target area as described according to the first example embodiment, or may be an image captured based on movement of the moving body 20 in a route based on a target area determined as in the second image. When, for example, a plurality of target areas are determined, the map generation unit 130 updates three-dimensional map information every time a second image for each target area is acquired. Then, based on the updated map information, a moving route for a next target area is determined. By doing so, accuracy of a moving route can be increased.

Further, according to the present example embodiment, a control unit 220 controls the moving body 20 and a second camera 210b in such a way as to capture an image of an object in which a three-dimensional shape should be determined, and thereby a second image may be acquired. The object in which a three-dimensional shape should be determined may be all objects in which a type is determined by the map generation unit 130, or a predetermined type of an object among objects in which a type is determined by the map generation unit 130. The control unit 220 may determine a moving route of the moving body 20, for example, in such a way as to spirally move around an object in which a three-dimensional shape should be determined. Further, the control unit 220 may determine a moving route of the moving body 20 in such as a way as to gradually separate from an object being a factor for determining a target area while circling the object around the object as the center. Then, the control unit 220 can cause, while moving the moving body 20 in the determined moving route, the second camera 210b to capture a second image including an object in which a three-dimensional shape should be determined. Further, the second image captured in this manner may be analyzed in order to detect a target object by a detection unit 170.

An example of a method of determining, by the map generation unit 130, a three-dimensional shape of an object is described below. The map generation unit 130 determines, for example, by using a second image acquired by capturing an image of an object from a plurality of directions, a shape and a size of the object. When, for example, an object is a tree, a size and a shape of the tree are determined as a three-dimensional shape. Further, from the distance measurement apparatus 230, point cloud data indicating a three-dimensional location of a plurality of points on a surface of the object are acquired. The map generation unit 130 acquires the point cloud data from the distance measurement apparatus 230, and extracts, based on a location and a type of the object indicated in map information, point data relevant to the object. Then, a three-dimensional shape of the object is determined in such a way that the extracted point data are included in the surface of the object.

The map generation unit 130 adds information indicating a determined three-dimensional shape of each object to the map information, and thereby generates three-dimensional map information. Herein, the map generation unit 130 may include, in the three-dimensional map information, information discriminating an "area being captured in a second image", i.e., an area where a situation is confirmed by the second image from an "area not being captured in the second image". For example, a shade of a tree or the like in which the moving body 20 has entrance difficult and an image cannot be captured is a so-called dead angle, and an area not being captured in the second image.

In the example in FIG. 8, the detection system 10 further includes the display unit 190. The display unit 190 is, for example, a display. In the example in FIG. 8, the display unit 190 is included in the detection apparatus 100, but the display unit 190 may be disposed separately from the detection apparatus 100. The display unit 190 displays three-dimensional map information generated by the map generation unit 130. Note that, the display unit 190 may display three-dimensional map information in a state where an area being captured in a second image and an area not being captured are discriminable from each other. For example, an area being captured in the second image and an area not being captured may be displayed with colors different from each other. A user who confirms such display can recognize an area which cannot be confirmed based on an image, and take another measure including, for example, going to the area for direct confirmation by a person, or the like, as necessary.

Next, an advantageous effect according to the present example embodiment is described. According to the present example embodiment, an advantageous effect similar to that of the first or second example embodiment is acquired. In addition, the map generation unit 130 according to the present example embodiment determines, by using a second image, a three-dimensional shape of an object, adds the determined three-dimensional shape to map information, and thereby generates three-dimensional map information. Therefore, a location safely accessible by the moving body 20 and an inaccessible location are further clarified. As a result, the moving body 20 can accurately move to a safely-accessible location, and thereby capture more second images which are effective. Further, a location inaccessible by the moving body 20 can be recognized, for example, as a location required to be directly confirmed by a person.

With reference to the drawings, example embodiments according to the present invention have been described, but these example embodiments are exemplification of the present invention, and various configurations other than the above-described configurations can be employed.

Further, in a plurality of flowcharts used in the above-described description, a plurality of steps (pieces of processing) are described in order, but an execution order of steps to be executed in each example embodiment is not limited to the described order. According to each example embodiment, an order of illustrated steps can be modified within an extent that there is no harm in context. Further, each of the above-described example embodiments can be combined within an extent that there is no conflict in content.

The whole or part of the example embodiments disclosed above can be described as, but not limited to, the following supplementary notes.

1-1. A detection system including:

an acquisition unit that acquires a first image, and a second image acquired by capturing an image of a narrower area than in the first image;

a map generation unit that generates, by using the first image, map information;

a determination unit that determines a target area in the map information; and a detection unit that analyzes the second image acquired by capturing an image of the target area, and thereby detects a target object.

1-2. The detection system according to supplementary note 1-1, in which the acquisition unit acquires, from one or more cameras mounted on a moving body, the first image and the second image.

1-3. The detection system according to supplementary note 1-2, further including:

the moving body; and the one or more cameras.

1-4. The detection system according to supplementary note 1-2 or 1-3, in which the first image is an image captured by a first camera among the one or more cameras, and the second image is an image captured by a second camera different from the first camera among the one or more cameras.

1-5. The detection system according to any one of supplementary notes 1-2 to 1-4, in which the moving body is a flying body.

1-6. The detection system according to any one of supplementary notes 1-2 to 1-5, further including a control unit that controls the moving body and the one or more cameras, in which the control unit moves, based on the map information, the moving body, and causes at least any of the one or more cameras to capture an image of the target area and thereby generate the second image.

1-7. The detection system according to any one of supplementary notes 1-1 to 1-5, in which the detection unit extracts a second image to be analyzed from a plurality of the second images acquired by the acquisition unit, and analyzes the extracted second image, and thereby detects the target object.

1-8. The detection system according to any one of supplementary notes 1-1 to 1-7, in which the map generation unit generates, by using the first image, the map information including information of a type and a location of an object.

1-9. The detection system according to supplementary note 1-8, in which the map generation unit determines, by using the second image, a three-dimensional shape of the object, adds the determined shape to the map information, and thereby generates three-dimensional map information.

1-10. The detection system according to any one of supplementary note 1-8 or 1-9, in which the acquisition unit further acquires a measurement result based on a distance measurement apparatus, and the map generation unit determines, by using a measurement result based on the distance measurement apparatus, at least either of a three-dimensional shape and a distance of the object, adds the determination result to the map information, and thereby generates three-dimensional map information.

1-11. The detection system according to any one of supplementary note 1-9 or 1-10, further including a display unit that displays the three-dimensional map information, in which the display unit displays the three-dimensional map information in a state where an area being captured in the second image and an area not being captured are discriminable from each other.

1-12. The detection system according to any one of supplementary notes 1-8 to 1-11, in which the determination unit determines the target area, based on a degree of certainty of a type of the object being determined by using the first image.

1-13. The detection system according to any one of supplementary notes 1-1 to 1-12, in which the determination unit detects a difference between the map information and previously-stored reference map information, and determines, based on the detection result, the target area.

2-1 A detection method including, by one or more computers:

acquiring a first image, and a second image acquired by capturing an image of a narrower area than in the first image;

generating, by using the first image, map information;

determining a target area in the map information; and analyzing the second image acquired by capturing an image of the target area, and thereby detecting a target object.

2-2. The detection method according to supplementary note 2-1, further including, by the one or more computers, acquiring, from one or more cameras mounted on a moving body, the first image and the second image.

2-3. The detection method according to supplementary note 2-2, in which the first image is an image captured by a first camera among the one or more cameras, and the second image is an image captured by a second camera different from the first camera among the one or more cameras.

2-4. The detection method according to supplementary note 2-2 or 2-3, in which the moving body is a flying body.

2-5. The detection method according to any one of supplementary notes 2-2 to 2-4, further including, by the one or more computers:

controlling the moving body and the one or more cameras;

in control of the moving body and the one or more cameras, moving, based on the map information, the moving body; and causing at least any of the one or more cameras to capture an image of the target area and thereby generate the second image.

2-6. The detection method according to any one of supplementary notes 2-1 to 2-4, further including, by the one or more computers:

extracting a second image to be analyzed from a plurality of the acquired second images; and analyzing the extracted second image, and thereby detecting the target object.

2-7. The detection method according to any one of supplementary notes 2-1 to 2-6, further including, by the one or more computers, generating, by using the first image, the map information including information of a type and a location of an object.

2-8. The detection method according to supplementary note 2-7, further including, by the one or more computers, determining, by using the second image, a three-dimensional shape of the object, adding the determined shape to the map information, and thereby generating three-dimensional map information.

2-9. The detection method according to supplementary note 2-7 or 2-8, further including, by the one or more computers:

acquiring a measurement result based on a distance measurement apparatus; and determining, by using a measurement result based on the distance measurement apparatus, at least either of a three-dimensional shape and a distance of the object, adding the determination result to the map information, and thereby generating three-dimensional map information.

2-10. The detection method according to any one of supplementary notes 2-7 to 2-9, further including, by the one or more computers, determining the target area, based on a degree of certainty of a type of the object being determined by using the first image.

2-11. The detection method according to any one of supplementary notes 2-1 to 2-10, further including, by the one or more computers, detecting a difference between the map information and previously-stored reference map information, and determining, based on the detection result, the target area.

3-1. A detection apparatus including:

an acquisition unit that acquires a first image, and a second image acquired by capturing an image of a narrower area than in the first image;

a map generation unit that generates, by using the first image, map information;

a determination unit that determines a target area in the map information; and a detection unit that analyzes the second image acquired by capturing an image of the target area, and thereby detects a target object.

3-2. The detection apparatus according to supplementary note 3-1, in which the acquisition unit acquires, from one or more cameras mounted on a moving body, the first image and the second image.

3-3. The detection apparatus according to supplementary note 3-2, in which the first image is an image captured by a first camera among the one or more cameras, and the second image is an image captured by a second camera different from the first camera among the one or more cameras.

3-4. The detection apparatus according to supplementary note 3-2 or 3-3, in which the moving body is a flying body.

3-5. The detection apparatus according to any one of supplementary notes 3-2 to 3-4, further including a control unit that controls the moving body and the one or more cameras, in which the control unit moves, based on the map information, the moving body, and causes at least any of the one or more cameras to capture an image of the target area and thereby generate the second image.

3-6. The detection apparatus according to any one of supplementary notes 3-1 to 3-4, in which the detection unit extracts a second image to be analyzed from a plurality of the second images acquired by the acquisition unit, and analyzes the extracted second image, and thereby detects the target object.

3-7. The detection apparatus according to any one of supplementary notes 3-1 to 3-6, in which
  the map generation unit generates, by using the first image, the map information including information of a type and a location of an object.

3-8. The detection apparatus according to supplementary note 3-7, in which
  the map generation unit determines, by using the second image, a three-dimensional shape of the object, adds the determined shape to the map information, and thereby generates three-dimensional map information.

3-9. The detection apparatus according to supplementary note 3-7 or 3-8, in which
  the acquisition unit further acquires a measurement result based on a distance measurement apparatus, and
  the map generation unit determines, by using a measurement result based on the distance measurement apparatus, at least either of a three-dimensional shape and a distance of the object, adds the determination result to the map information, and thereby generates three-dimensional map information.

3-10. The detection apparatus according to supplementary note 3-8 or 3-9, further including
  a display unit that displays the three-dimensional map information, in which
  the display unit displays the three-dimensional map information in a state where an area being captured in the second image and an area not being captured are discriminable from each other.

3-11. The detection apparatus according to any one of supplementary notes 3-7 to 3-10, in which
  the determination unit determines the target area, based on a degree of certainty of a type of the object being determined by using the first image.

3-12. The detection apparatus according to any one of supplementary notes 3-1 to 3-11, in which
  the determination unit detects a difference between the map information and previously-stored reference map information, and determines, based on the detection result, the target area.

4-1. A program causing a computer to function as a detection apparatus, in which
  the detection apparatus includes
    an acquisition unit that acquires a first image, and a second image acquired by capturing an image of a narrower area than in the first image,
    a map generation unit that generates, by using the first image, map information,
    a determination unit that determines a target area in the map information, and
    a detection unit that analyzes the second image acquired by capturing an image of the target area, and thereby detects a target object.

4-2. The program according to supplementary note 4-1, in which
  the acquisition unit acquires, from one or more cameras mounted on a moving body, the first image and the second image.

4-3. The program according to supplementary note 4-2, in which
  the first image is an image captured by a first camera among the one or more cameras, and the second image is an image captured by a second camera different from the first camera among the one or more cameras.

4-4. The program according to supplementary note 4-2 or 4-3, in which
  the moving body is a flying body.

4-5. The program according to any one of supplementary notes 4-2 to 4-4, in which
  the detection apparatus further includes a control unit for controlling the moving body and the one or more cameras,
  the control unit
    moves, based on the map information, the moving body, and
    causes at least any of the one or more cameras to capture an image of the target area and thereby generate the second image.

4-6. The program according to any one of supplementary notes 4-1 to 4-4, in which
  the detection unit
    extracts a second image to be analyzed from a plurality of the second images acquired by the acquisition unit, and
    analyzes the extracted second image, and thereby detects the target object.

4-7. The program according to any one of supplementary notes 4-1 to 4-6, in which
  the map generation unit generates, by using the first image, the map information including information of a type and a location of an object.

4-8. The program according to supplementary note 4-7, in which
  the map generation unit determines, by using the second image, a three-dimensional shape of the object, adds the determined shape to the map information, and thereby generates three-dimensional map information.

4-9. The program according to supplementary note 4-7 or 4-8, in which
  the acquisition unit further acquires a measurement result based on a distance measurement apparatus, and
  the map generation unit determines, by using a measurement result based on the distance measurement apparatus, at least either of a three-dimensional shape and a distance of the object, adds the determination result to the map information, and thereby generates three-dimensional map information.

4-10. The program according to any one of supplementary notes 4-7 to 4-9, in which
  the determination unit determines the target area, based on a degree of certainty of a type of the object being determined by using the first image.

4-11. The program according to any one of supplementary notes 4-1 to 4-10, in which
  the determination unit detects a difference between the map information and previously-stored reference map information, and determines, based on the detection result, the target area.

5-1. A computer readable storage medium storing a program causing a computer to function as a detection apparatus, in which
  the detection apparatus includes
    an acquisition unit that acquires a first image, and a second image acquired by capturing an image of a narrower area than in the first image,
    a map generation unit that generates, by using the first image, map information,
    a determination unit that determines a target area in the map information, and a detection unit that analyzes the second image acquired by capturing an image of the target area, and thereby detects a target object.

5-2. The storage medium according to supplementary note 5-1, in which the acquisition unit acquires, from one or more cameras mounted on a moving body, the first image and the second image.

5-3. The storage medium according to supplementary note 5-2, in which the first image is an image captured by a first camera among the one or more cameras, and the second image is an image captured by a second camera different from the first camera among the one or more cameras.

5-4. The storage medium according to supplementary note 5-2 or 5-3, in which the moving body is a flying body.

5-5. The storage medium according to any one of supplementary notes 5-2 to 5-4, in which the detection apparatus further includes a control unit for controlling the moving body and the one or more cameras, the control unit moves, based on the map information, the moving body, and causes at least any of the one or more cameras to capture an image of the target area and thereby generate the second image.

5-6. The storage medium according to any one of supplementary notes 5-1 to 5-4, in which the detection unit extracts a second image to be analyzed from a plurality of the second images acquired by the acquisition unit, and analyzes the extracted second image, and thereby detects the target object.

5-7. The storage medium according to any one of supplementary notes 5-1 to 5-6, in which the map generation unit generates, by using the first image, the map information including information of a type and a location of an object.

5-8. The storage medium according to supplementary note 5-7, in which the map generation unit determines, by using the second image, a three-dimensional shape of the object, adds the determined shape to the map information, and thereby generates three-dimensional map information.

5-9. The storage medium according to supplementary note 5-7 or 5-8, in which the acquisition unit further acquires a measurement result based on a distance measurement apparatus, and the map generation unit determines, by using a measurement result based on the distance measurement apparatus, at least either of a three-dimensional shape and a distance of the object, adds the determination result to the map information, and thereby generates three-dimensional map information.

5-10. The storage medium according to any one of supplementary notes 5-7 to 5-9, in which the determination unit determines the target area, based on a degree of certainty of a type of the object being determined by using the first image.

5-11. The storage medium according to any one of supplementary notes 5-1 to 5-10, in which the determination unit detects a difference between the map information and previously-stored reference map information, and determines, based on the detection result, the target area.

The invention claimed is:

1. A detection system comprising:

at least one memory configured to store instructions; and at least one processor configured to execute the instructions to perform operations comprising:

acquiring a first image, and a second image, wherein the second image is acquired by capturing an image of a narrower area than in the first image;

determining a type of an object included in the first image;

determining a location of the object on a map, wherein the location of the object on a map is determined by using information indicating an image capture location associated with the first image, information indicating an image capture direction, an angle of view of a camera capturing the first image, and a location and a size of the object included in the first image;

generating map information in which the type of object and the locations of the object are mapped;

determining a target area in the map information; and analyzing the second image by capturing an image of the target area, and thereby detecting a target object.

2. The detection system according to claim 1, further comprising:

a moving body; and one or more cameras mounted on the moving body, wherein acquiring the first image and the second image comprises acquiring, from the one or more cameras mounted on the moving body, the first image and the second image.

3. The detection system according to claim 2, wherein the first image is an image captured by a first camera among the one or more cameras, and the second image is an image captured by a second camera different from the first camera among the one or more cameras.

4. The detection system according to claim 2, wherein the moving body is a flying body.

5. The detection system according to claim 2, wherein the operations further comprise controlling the moving body and the one or more cameras, and controlling the moving body and the one or more cameras comprises moving, based on the map information generated by using the first image, the moving body, and causing at least any of the one or more cameras to capture an image of the target area and thereby generating the second image.

6. The detection system according to claim 1, wherein the operations further comprise:

acquiring a plurality of second images by capturing images of narrower areas than in the first image; and extracting a second image to be analyzed from the plurality of second images, wherein analyzing the second image comprises analyzing the extracted second image.

7. The detection system according to claim 1, wherein the operations further comprise detecting a difference between the map information generated using the first image and previously-stored reference map information; and based on a detection result determined by detecting the difference between the map information and the previously-stored reference map information, determining the target area.

8. The detection system according to claim 1, wherein the operations further comprise:

deriving, for the object included in the first image, a degree of certainty of the type of the object; and in a case of the derived degree of certainty of the type of the object is lower than a predetermined reference, outputting the first image including the object to a display in a state where the object is discriminable from another object.

9. The detection system according to claim 1, wherein the operations further comprise deriving, for the object included in the first image, a degree of certainty of the type of the object, and wherein the determining the target area in the map information comprises determining, in a case where the degree of certainty of the type of the object is lower than a predetermined reference, an area including the object as the target area.

10. The detection system according to claim 1, wherein the operations further comprise determining, in the map information generated by using the first image, an object of a predetermined type, and wherein the determining the target area in the map information comprises determining, as the target area, an area having a location relation determined for the object of the predetermined type.

11. The detection system according to claim 1, wherein the generating the map information comprises:

determining, by using the second image, a three-dimensional shape of the object included in the first image; and adding the determined three-dimensional shape to the map information, and generating three-dimensional map information.

12. The detection system according to claim 11, wherein the operations further comprise displaying the three-dimensional map information in a state where an area being captured in the second image and an area not being captured are discriminable from each other.

13. A detection method comprising, by one or more computers:

acquiring a first image, and a second image, wherein the second image is acquired by capturing an image of a narrower area than in the first image;

determining a type of an object included in the first image;

determining a location of the object on a map, wherein the location of the object on a map is determined by using information indicating an image capture location associated with the first image, information indicating an image capture direction, an angle of view of a camera capturing the first image, and a location and a size of the object in the first image;

generating map information in which the type of object and the locations of the object are mapped;

determining a target area in the map information; and analyzing the second image acquired by capturing an image of the target area, and thereby detecting a target object.

14. The detection method according to claim 13, wherein acquiring the first image and the second image comprises acquiring, from one or more cameras mounted on a moving body, the first image and the second image.

15. The detection method according to claim 14, wherein the first image is an image captured by a first camera among the one or more cameras, and the second image is an image captured by a second camera different from the first camera among the one or more cameras.

16. The detection method according to claim 14, further comprising, by the one or more computers, controlling the moving body and the one or more cameras, wherein controlling the moving body and the one or more cameras comprises moving, based on the map information generated by using the first image, the moving body, and causing at least any of the one or more cameras to capture an image of the target area and thereby generating the second image.

17. The detection method according to claim 13, further comprising, by the one or more computers:

acquiring a plurality of second images acquired by capturing images of narrower areas than in the first image; and extracting a second image to be analyzed from the plurality of second images, wherein analyzing the second image comprises analyzing the extracted second image.

18. The detection method according to claim 13, further comprising, by the one or more computers, detecting a difference between the map information generated by using the first image and previously-stored reference map information; and based on a detection result determined by detecting the difference between the map information and the previously-stored reference map information, determining the target area.

19. A non-transitory storage medium storing a program causing a computer to execute a detection method, the detection method comprising:

acquiring a first image, and a second image wherein the second image is acquired by capturing an image of a narrower area than in the first image;

determining a type of an object included in the first image;

determining a location of the object on a map, wherein the location of the object on a map is determined by using information indicating an image capture location associated with the first image, information indicating an image capture direction, an angle of view of a camera capturing the first image, and a location and a size of the object in the first image;

generating map information in which the type of the object and the locations of the object are mapped;

determining a target area in the map information; and analyzing the second image acquired by capturing an image of the target area, and thereby detecting a target object.

* * * * *